US012651598B2

(12) United States Patent
Hannun et al.

(10) Patent No.: US 12,651,598 B2
(45) Date of Patent: Jun. 9, 2026

(54) AUTOMATIC SWITCHING BETWEEN LANGUAGES DURING VIRTUAL CONFERENCES

(71) Applicant: Zoom Video Communications, Inc., San Jose, CA (US)

(72) Inventors: Awni Yusuf Hannun, Los Altos, CA (US); Sebastian Stüker, Karlsruhe (DE)

(73) Assignee: Zoom Communications, Inc., San Jose, CA (US)

( * ) Notice: Subject to any disclaimer, the term of this patent is extended or adjusted under 35 U.S.C. 154(b) by 299 days.

(21) Appl. No.: 17/732,798

(22) Filed: Apr. 29, 2022

(65) Prior Publication Data
US 2023/0352011 A1 Nov. 2, 2023

(51) Int. Cl.
*G10L 15/22* (2006.01)
*G10L 15/00* (2013.01)
(Continued)

(52) U.S. Cl.
CPC ............ *G10L 15/22* (2013.01); *G10L 15/005* (2013.01); *G10L 25/57* (2013.01); *G06F 40/58* (2020.01); *G10L 15/26* (2013.01)

(58) Field of Classification Search
CPC ......... G10L 15/22; G10L 15/26; G10L 15/30; G06F 40/263; G06F 40/40; G06F 40/49; G06F 40/53; G06F 40/58; H04N 7/15; H04N 7/152; H04N 7/155; H04N 7/157; H04M 2203/2038; H04M 2203/2044; H04M 2203/2033; H04M 2203/5072; H04M 2203/5063; H04M 2203/5054;

H04M 2203/5045; H04M 2203/0536; H04M 2203/5018; H04M 2203/50; H04M 2203/5009; H04M 2203/5081; H04M 2242/12; H04M 2242/14;
(Continued)

(56) References Cited

U.S. PATENT DOCUMENTS 8,155,947 B2 * 4/2012 Bailey ..................... G06F 40/58
704/277
10,147,428 B1 * 12/2018 Shastry ................ H04N 19/187
(Continued)

FOREIGN PATENT DOCUMENTS

CN 101674452 A 3/2010

OTHER PUBLICATIONS

EP International Search Report and Written Opinion for PCT/US2023/017583 mailed Jun. 29, 2023.

*Primary Examiner* — Jakieda R Jackson
(74) *Attorney, Agent, or Firm* — Kilpatrick Townsend & Stockton LLP

(57) ABSTRACT

In some aspects, a computing device may access audio information comprising an audio stream from a client device, and a source-language. The computing device may provide an audio segment from the audio stream to a language identification process of the computing device comprising a machine learning model that is trained to identify a language of a plurality of languages within recorded speech. The computing device may identify an identified-language of the plurality of languages for the speech based at least in part on the audio segment. The computing device may update the source-language to the identified language. Numerous other aspects are described.

20 Claims, 10 Drawing Sheets

810 — ACCESS AUDIO INFORMATION COMPRISING AN AUDIO STREAM FROM A CLIENT DEVICE

820 — PROVIDE AN AUDIO SEGMENT FROM THE AUDIO STREAM TO A LANGUAGE IDENTIFICATION PROCESS

830 — IDENTIFY AN IDENTIFIED-LANGUAGE

840 — UPDATE THE SOURCE-LANGUAGE TO THE IDENTIFIED-LANGUAGE

850 — PROVIDE THE IDENTIFIED-LANGUAGE TO A TRANSLATION PROCESS

800

(51) Int. Cl.
*G10L 25/57* (2013.01)
*G06F 40/58* (2020.01)
*G10L 15/26* (2006.01)

(58) Field of Classification Search
CPC ......... H04M 2203/2061; H04M 3/567; H04M 3/568; H04M 7/0027; H04L 65/043
See application file for complete search history.

(56) References Cited

U.S. PATENT DOCUMENTS

| | | | |
|---|---|---|---|
| 10,916,241 B1* | 2/2021 | Edwards | G10L 15/22 |
| 11,315,545 B2* | 4/2022 | Wintrode | G10L 15/005 |
| 11,322,136 B2* | 5/2022 | Apsingekar | G06N 3/045 |
| 2002/0010573 A1* | 1/2002 | Wakita | G06F 40/247 704/2 |
| 2004/0030550 A1* | 2/2004 | Liu | G10L 15/26 704/231 |
| 2009/0299732 A1* | 12/2009 | Hao | G06F 40/289 704/10 |
| 2009/0326939 A1* | 12/2009 | Toner | H04M 3/42391 704/235 |
| 2010/0100537 A1* | 4/2010 | Druzgalski | H04L 12/1859 707/750 |
| 2011/0246172 A1* | 10/2011 | Liberman | H04M 3/56 348/14.09 |
| 2012/0203553 A1* | 8/2012 | Maruta | C01G 41/00 704/E13.011 |
| 2012/0215539 A1* | 8/2012 | Juneja | G10L 15/193 704/E15.005 |
| 2013/0080146 A1* | 3/2013 | Kato | G10L 15/005 704/2 |
| 2013/0081142 A1* | 3/2013 | McDougal | G06F 21/577 726/24 |
| 2014/0035823 A1* | 2/2014 | Khoe | G06F 3/04886 345/171 |
| 2015/0364129 A1* | 12/2015 | Gonzalez-Dominguez | G10L 15/005 704/251 |
| 2016/0035344 A1* | 2/2016 | Gonzalez-Dominguez | G06N 3/044 704/254 |
| 2016/0080685 A1* | 3/2016 | De Saint Salvy | G11B 27/3027 386/285 |
| 2016/0203832 A1* | 7/2016 | Paul | G10L 25/63 704/238 |
| 2017/0309142 A1* | 10/2017 | Phillips | G08B 13/1672 |
| 2018/0018959 A1* | 1/2018 | Des Jardins | G10L 15/08 |
| 2018/0176516 A1* | 6/2018 | Modestine | H04W 52/0254 |
| 2018/0342239 A1* | 11/2018 | Baughman | G10L 15/005 |
| 2018/0342257 A1* | 11/2018 | Huffman | G10L 15/063 |
| 2019/0172444 A1* | 6/2019 | Hiroe | G10L 15/10 |
| 2019/0273767 A1 | 9/2019 | Nelson et al. | |
| 2019/0355345 A1* | 11/2019 | Fu | G10L 15/005 |
| 2020/0013391 A1* | 1/2020 | Park | G10L 15/04 |
| 2020/0020320 A1* | 1/2020 | Lee | G10L 15/22 |
| 2020/0043481 A1* | 2/2020 | Xiong | H04L 65/75 |
| 2020/0134026 A1* | 4/2020 | Lovitt | H04R 3/005 |
| 2020/0160845 A1* | 5/2020 | Lavilla | G10L 15/005 |
| 2020/0279553 A1* | 9/2020 | McDuff | G10L 25/78 |
| 2020/0372902 A1* | 11/2020 | Takami | G03B 21/62 |
| 2021/0110818 A1* | 4/2021 | Kim | G10L 15/187 |
| 2021/0193125 A1* | 6/2021 | Kim | G10L 15/142 |
| 2021/0193138 A1* | 6/2021 | Yu | G10L 15/22 |
| 2021/0195281 A1* | 6/2021 | Zhao | G06N 3/04 |
| 2021/0233517 A1* | 7/2021 | Gong | G10L 15/16 |
| 2021/0358475 A1* | 11/2021 | Shin | G06F 3/04842 |
| 2022/0028396 A1* | 1/2022 | Li | G10L 15/26 |
| 2022/0147257 A1* | 5/2022 | Bhowmik | G06F 3/0665 |
| 2022/0310077 A1* | 9/2022 | Tu | G10L 15/22 |
| 2022/0311641 A1* | 9/2022 | Gordon | H04L 12/4633 |
| 2022/0343893 A1* | 10/2022 | Hung | G06F 40/58 |
| 2022/0374618 A1* | 11/2022 | Zhao | G06F 40/58 |
| 2023/0067265 A1* | 3/2023 | DeLuca | G06Q 10/1095 |
| 2023/0089902 A1* | 3/2023 | Arkhangorodsky | G06F 40/58 704/277 |
| 2023/0169988 A1* | 6/2023 | Kim | G06N 3/045 704/200 |
| 2023/0178083 A1* | 6/2023 | Sharifi | G10L 15/22 704/246 |
| 2023/0419947 A1* | 12/2023 | Shih | G10L 13/0335 |

* cited by examiner

710 ~ ACCESS AUDIO INFORMATION COMPRISING AN AUDIO STREAM FROM A CLIENT DEVICE

720 ~ PROVIDE AN AUDIO SEGMENT FROM THE AUDIO STREAM TO A LANGUAGE IDENTIFICATION PROCESS

730 ~ IDENTIFY AN IDENTIFIED-LANGUAGE

740 ~ ENABLING TRANSLATION OF THE IDENTIFIED-LANGUAGE

700

810 ~ ACCESS AUDIO INFORMATION COMPRISING AN AUDIO STREAM FROM A CLIENT DEVICE

820 ~ PROVIDE AN AUDIO SEGMENT FROM THE AUDIO STREAM TO A LANGUAGE IDENTIFICATION PROCESS

830 ~ IDENTIFY AN IDENTIFIED-LANGUAGE

840 ~ UPDATE THE SOURCE-LANGUAGE TO THE IDENTIFIED-LANGUAGE

850 ~ PROVIDE THE IDENTIFIED-LANGUAGE TO A TRANSLATION PROCESS

800

AUTOMATIC SWITCHING BETWEEN LANGUAGES DURING VIRTUAL CONFERENCES

FIELD

The present application generally relates to virtual conferences and more specifically relates to automated language identification during virtual conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
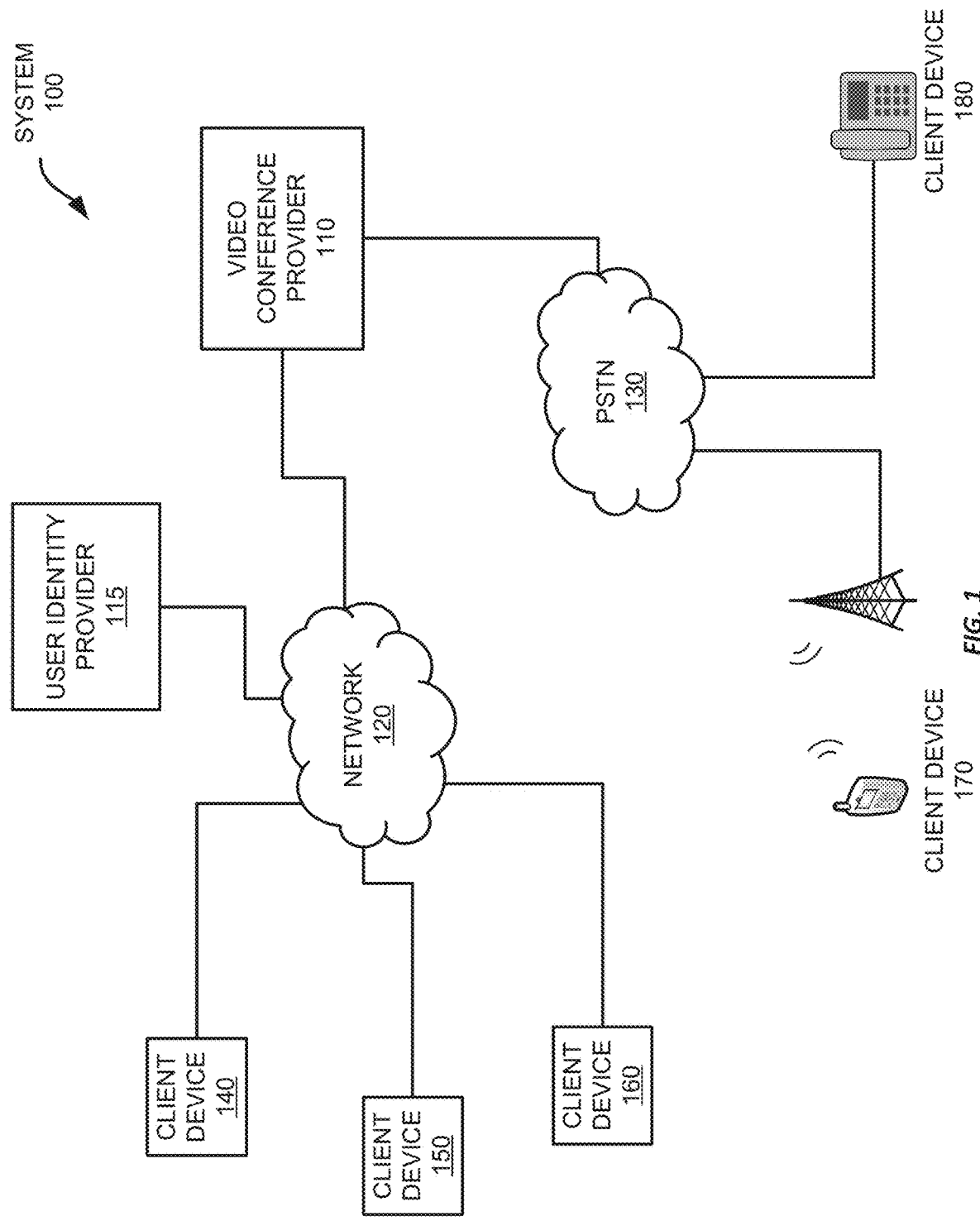
FIGS. 1-4 show example systems for detecting languages during virtual conferences.

Examples are described herein in the context of automated language identification during virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically such participants will interact in a virtual conference using a camera and microphone, which provides video and audio streams (each a "media" stream) that can be delivered to the other participants by the virtual conference provider and be displayed via the various client devices' displays or speakers. However, because virtual conferences allow participants to connect from anywhere in the world, oftentimes different participants may have different native languages. And while some people are able to converse in multiple languages, others cannot. Thus, in settings where multiple people do not speak a common language, one or more interpreters may be needed to translate for the various participants. However, this is typically costly and inconvenient.

To enable different participants who speak different languages to converse with each other, a virtual conference provider may provide real-time translation of a speaker from the speaker's native language into the native language of another participant in the virtual conference. The translation may then be provided to the other participant as text or speech presented in the other participant's native language.

Providing translations can involve identifying a source language and a target language. The input to a translation service can be annotated with the source language and the output can be provided as speech or text in the target language. A translation service, such as a translation process or a human translator, may only be able to translate certain languages. The source language and the target language can be directly provided to the translation process by the language identification process or indirectly via a transcription process. In some circumstances, a translation service can translate between more than one language, though it may only be able to handle one source language or one target language simultaneously. Identifying a source language can facilitate routing text or speech to an appropriate translation service.

By default, the target language can be designated by the host for a virtual conference. For instance, the target language can be a language associated with the host's user profile, or the host can select a meeting language when scheduling the virtual conference. Similarly, translation services can be provided for meeting participants, and each client device can have a language that is selected by the device's user or taken from the user's profile. If the meeting language and the client device language differ, the source language for the client device can be the meeting language and the target language can be the client device language.

Selecting a source language can be challenging for a user. The output from a translation, or target language, is likely intelligible to a user and the user can know and recognize the target language. In contrast, the source language may be unintelligible and unrecognizable to a user. A user, fluent in French and English, may select French as a target language via user interface (UI) on a client device, but that user may be unsure whether the source language is Mandarin or Cantonese. In some instances, transcription services may be provided for each host device participating in the virtual conference and a user might struggle to select a source language for each media stream in the virtual conference.

Using user profile data to identify a target, or source, language can be complicated by multilingual videoconference participants. If multiple languages are designated in a user profile, it can be unclear which language should be selected as a source or target language. If the user profile can only list one language, and the user has multiple fluencies, the user may be speaking a language that is not documented on her user profile. Additionally, several users may join a videoconference from a single client device, and a speaker's user profile data may not be available to the videoconferencing service.

Allowing a user to select a source and target language, or identifying languages based on user profile data, is an imperfect solution because video conference participants may switch between languages. A multilingual video conference participant may switch between languages based on the audience or subject. As an example, the video conference participant, fluent in French and English, may feel more comfortable discussing technical subjects in French. The participant may speak in English for the majority of the meeting, to accommodate an English speaking audience, but switch to French when discussing technical details. The video conference participant may dynamically switch between these languages, and selecting a language via a UI may be impractical.

The source language or target language can be identified by a language identification process comprising a trained machine learning model. The language identification model can be a neural network, such as a multi-layered convolutional neural network, that is created by training an algorithm on speech datasets. The speech dataset may comprise recorded speech in one or more languages, and the speech dataset can be divided into audio segments. An algorithm can be trained to produce a language identification model by providing audio segments containing speech in a language as an input to the model. During training, model parameters, and hyperparameters, can be tuned, or modified, until the model accurately classifies the language. The language identification model may be trained to recognize one or more languages, and, in some instances, the model may be trained to indicate that the language is unrecognized.

The output from the language identification model may be a confidence score for one or more languages. The confidence score for a language can be a probability that the audio segment contains that language. If the language identification model is trained to recognize multiple languages, the confidence score can be generated for each language. In some circumstances, the model may be trained to indicate that the language is not recognized and a confidence score can be generated for an unidentified language indicator in addition to the confidence scores for the languages. The language identification model may classify an audio segment as containing a language if the confidence score for that language is above a threshold. The model may classify an audio segment as an unidentified language if no confidence score is above a threshold or, possibly, if the confidence score for the unidentified language indicator is above a threshold.

In addition to detecting a language, it may be desirable to detect when a language has changed. For instance, a multilingual video conference participant may switch between languages as discussed above. Detecting switches between languages can present challenges. For instance, a speaker talking in a first language may use terminology or words from a second language without beginning to speak in the second language. Additionally, loan words, words adopted from another language, may cause a model to falsely detect a new language (e.g., "the charge d'affaires received a communique at the embassy" might cause a model to detect French). A video conferencing service may provide a frustrating user experience if a video conference host, or a video conference participant, is notified of a language change when the speaking language has not changed.

The language identification process can be configured to detect and notify a user of authentic language changes. After an initial language change has been made, the source language can be updated to the detected language. In some instances, the source language can be updated, and a notification can be provided to a client device, if the source language and the identified language differ. If the source language and identified language are in agreement, the user may not be notified because no change will be made.

Upon updating the language, a change timer can be initiated. A change flag can be toggled from a passive state to an active state for the duration of the change timer. The change flag can indicate to the language identification service that the language has been recently updated. In some instances, the language identification service may not update the source language for the duration of the change timer.

Potentially, the length of an audio segment may change during the change timer, and a longer segment of a detected language may be input to a language identification service. Additionally, the confidence threshold for the machine learning model in the language identification service may be altered for the duration of the change timer. These techniques can be used to reduce errant changes in language after a language has been detected.

This illustrative example is given to introduce the reader to the general subject matter discussed herein and the disclosure is not limited to this example. The following sections describe various additional non-limiting examples and examples of providing real-time translation during virtual conferences Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity. In some instances, video conference provider 110 may provide a user profile language to video conference provider 210.

Figure 2:
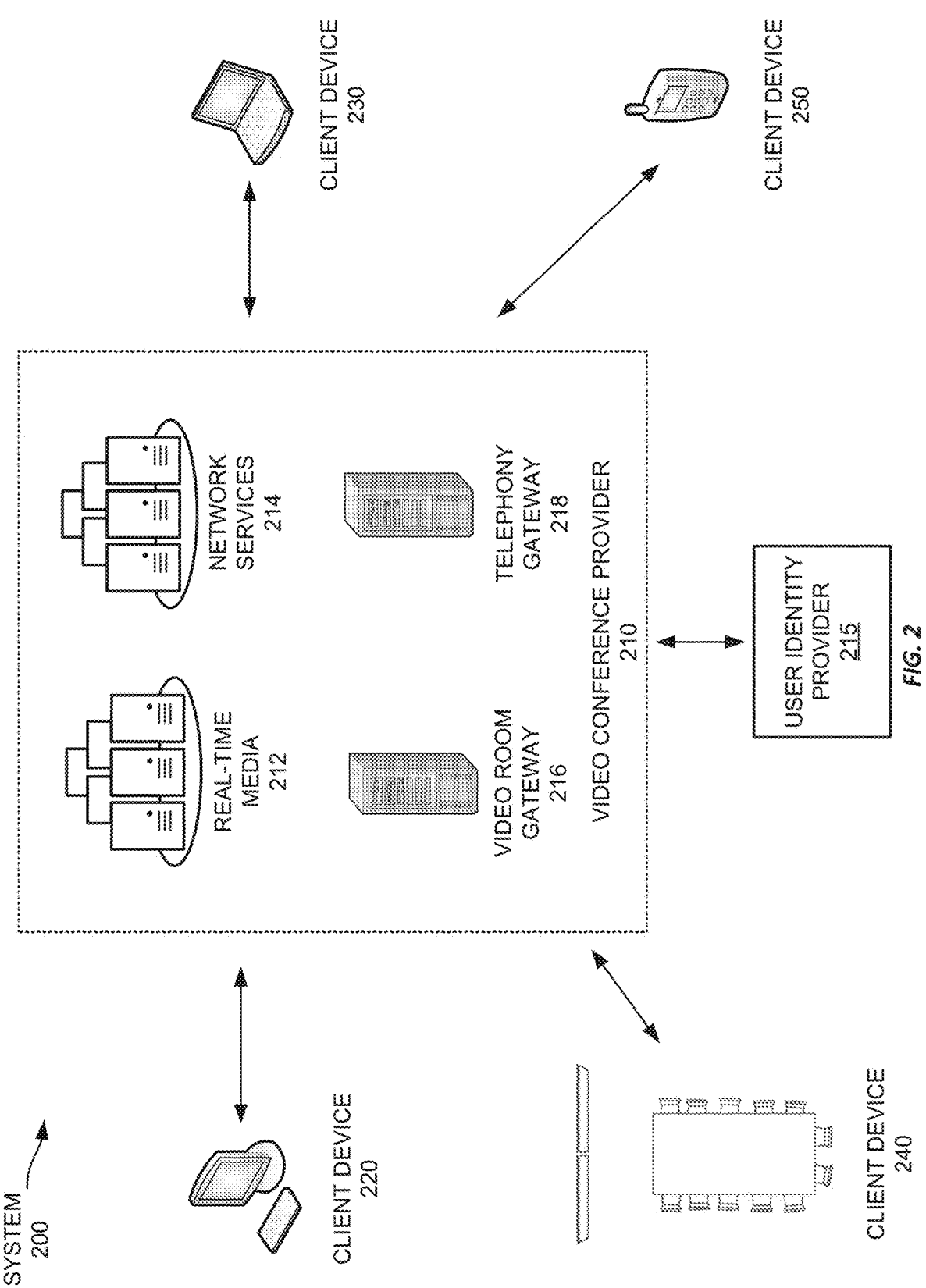

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, a meeting language, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively. The user identify provider 115 may provide a user profile language to the video conference provider 110.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including keypair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams. In some instances, the real-time media servers 212 may store a source language, target language, user profile language, meeting language, or identified language for the multimedia streams sent and received by the server.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
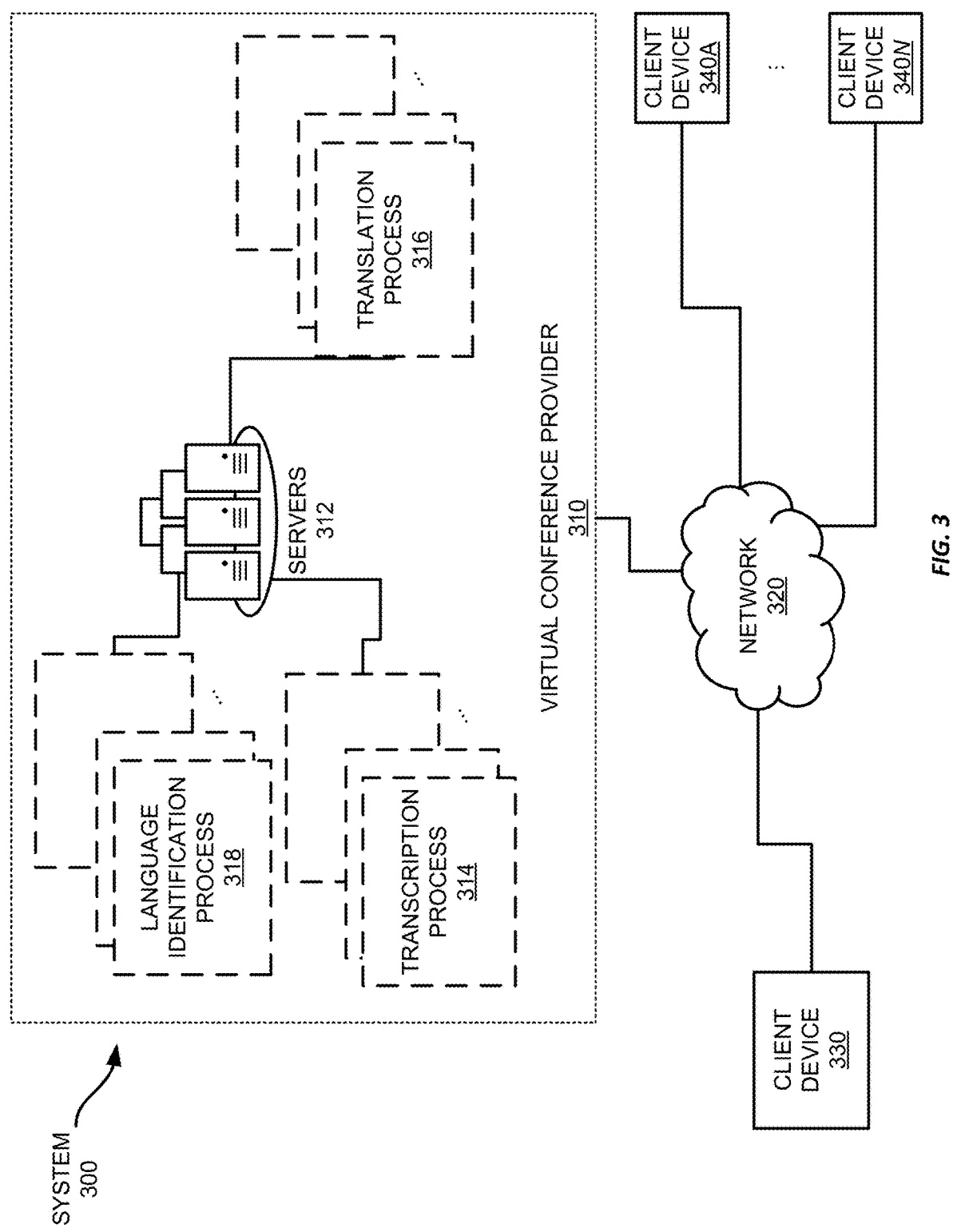

Referring now to FIG. 3, FIG. 3 shows an example system 300 for providing real-time translation during virtual conferences. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software, which connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves.

The virtual conference provider 310 operates a number of servers 312 that can provide transcription and translation functionality. Transcription functionality is provided by one or more transcription processes 314 that can be executed and allocated to virtual conferences hosted by the virtual conference provider 310. Similarly, translation functionality is provided by one or more translation processes 316 that can be executed and allocated to virtual conferences hosted by the virtual conference provider 310. In addition, language identification functionality is provided by one or more language identification processes 318 that can be executed an allocated to virtual conferences hosted by virtual conference provider 310.

Client device 330, 340a-n may join virtual conferences hosted by the virtual conference provider 310 by connecting to the virtual conferences provider and joining a desired virtual conference, generally as discussed above with respect to FIGS. 1-2. Once the participants have joined the conference, they may interact with each other by exchanging audio and video feeds. However, if different participants do not speak a common language with each other, they can request translation services from the virtual conference provider 310.

To request translation services, a participant may select an option within their client software to enable translations. They may then select one or more source languages and a target language for the translation(s). The client software then sends a request to the virtual conference provider 310 for the selected translation services.

After receiving a request for translation services, the virtual conference provider 310 allocates one or more transcription processes 314 to the virtual conference, with one transcription process 314 allocated for each selected source language. In this example, each transcription process 314 is configured to generate a transcript in multiple input languages, however, in some cases, a transcription process 314 may only handle a single input language. Thus, appropriate transcription processes may be selected, or the language may be provided by one or more language identification processes 318.

Similarly, the virtual conference provider 310 allocates one or more translation processes 316, depending on the selections made by the participant. As with the transcription processes, each translation process 316 is configured to translate from multiple sources languages into a specific target language. Though other examples may translate from any one of multiple source languages into any one of multiple target languages, or they may be specific to a single source language and a single target language. The source language or the target language may be detected and provided by one or more language identification processes 318. However, based on its configuration, the virtual conference provider 310 allocates the appropriate translation process(es) 316 to the virtual conference.

The transcription processes 314 receive audio streams from the virtual conference and generate a textual representation of spoken words in the source language. The textual representation may then be stored as a transcript of the call, but it is also provided to the translation process(es) 316 to translate into a textual representation in the target language(s). The translated text is then provided to the requesting client device(s) 330, 340*a-n* and provided as closed captions or in a separate display area of the client software's GUI to enable the participant to view the translation.

To allow the translation to occur in real-time, the transcription process 314 streams its output to the translation process 316, which translates as it receives the text. However, simply streaming transcribed text may not provide an accurate or low-latency translation due to differences in sentence structure between different languages, e.g., some languages typically place verbs near the end of the sentence while others typically place them near the beginning, or due to a word or phrase appearing to have one meaning standing alone, but a different meaning once more fulsome context is available, e.g., from subsequently spoken words.

To accommodate such issues, the translation process 316 may output translated text as soon as it is available on a word-by-word basis, however, it may retain memory of recently translated text and, as new text arrives from a transcription process, it may update its translation based on additional context or other parts of speech that were previously missing. The updated translation may be provided to the client device and may be flagged as an updated translation, which then allows the client device to replace previously displayed translated text with the updated translation. Thus, for each client device that requests translation from a source language (or multiple source languages) to a target language, the virtual conference provider 310 will allocate the appropriate transcription and translation processes 314, 316.

Once the virtual conference has concluded, the virtual conference provider 310 de-allocates the allocated language identification, transcription, and translation processes 318, 314, 316 from the virtual conference and returns them to the pool of available, but idle language identification, transcription, and translation processes 318, 314, 316, making them available to be allocated to other virtual conferences or for termination if the virtual conference provider 310 determines it has too many idle language identification, transcription, or translation processes 318, 314, 316.

Figure 4:
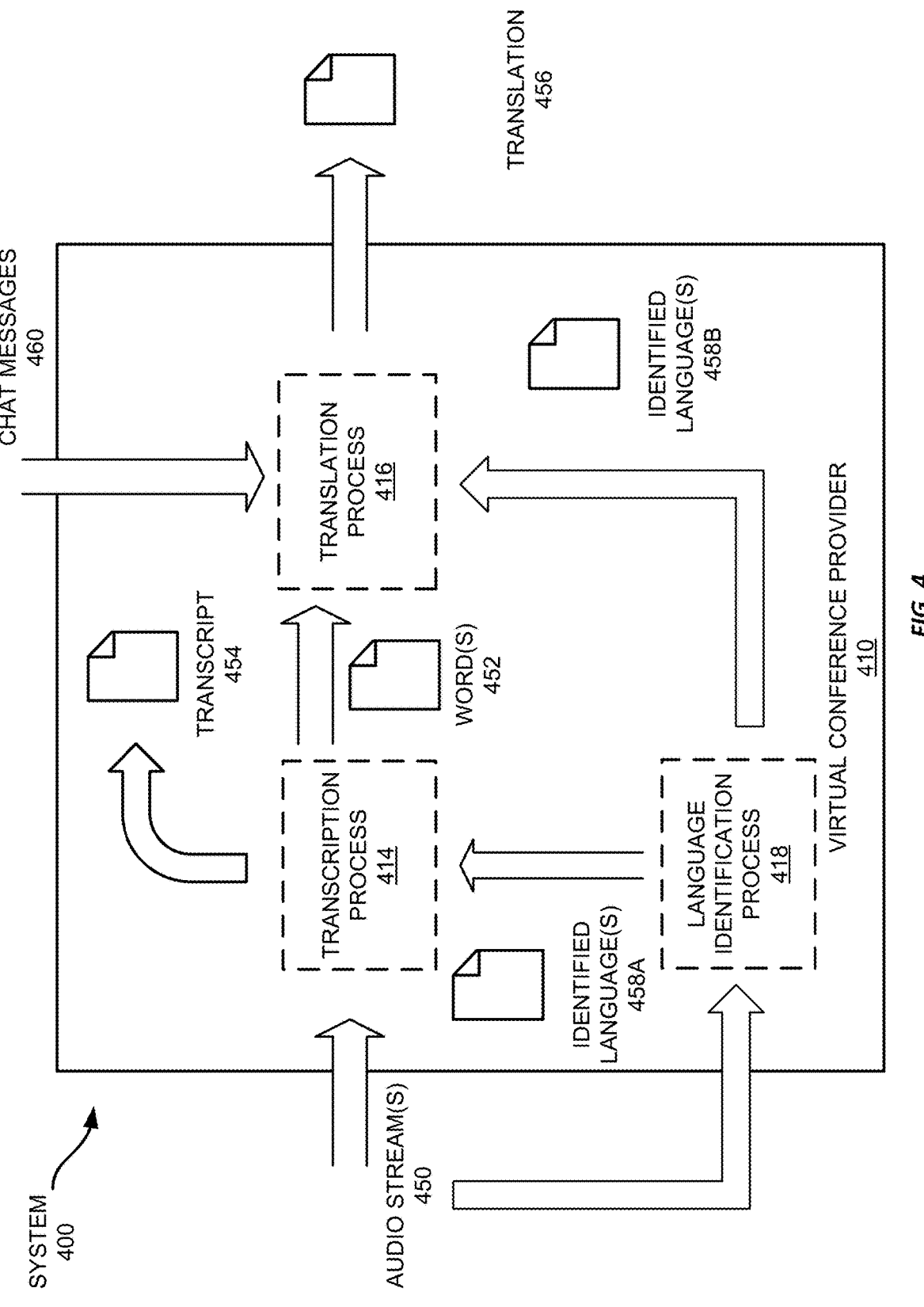

Referring now to FIG. 4, FIG. 4 shows an example data flow diagram for system that provides real-time translation during virtual conferences. The system includes a virtual conference provider 410 that is hosting a virtual conference between multiple client devices, such as client device 330, 340*a-n*. The virtual conference provider 410 has received a request to translate one or more audio streams in a source language to a target language. During the virtual conference, the virtual conference provider 410 receives audio streams 450 from the various client devices and identifies one or more audio streams in the first language, such as by receiving an identification of a participant within the translation request or by performing language identification on the received audio streams. The language identification can be provided by a language identification process 418. The language identification process can provide identified language(s) 458*a-b* to the transcription process 414 or the translation process 416. The language identification process 418 can use a trained machine learning model to identify (e.g., recognize) one or more languages.

The audio stream(s) 450 to be translated are then provided to a transcription process 414, which generates one or more words 452 that contain a textual representation of speech contained in the audio stream(s). The words 452 are then provided to one or more allocated translation processes 416. If multiple participants have requested translation of the same source language into different target languages, multiple different translation processes 416 may be allocated, though a single transcription process 414 may generate a transcript and provide it to the respective transcription processes 416. Similarly, any number of source and target languages may be employed, which would involve using a suitable set of transcription and translation processes 414, 416 based on the selected languages or the identified languages 458*a-b*. After generating the words 452, they may also be stored as a transcript 454 in a storage medium and later provided to one or more participants, if a transcript of the virtual conference has been requested. Otherwise, the words 452 may be discarded by the translation process 416 once they are no longer needed for translation.

As discussed above, the words 452 and translation 456 may be generated in real-time, and thus, the words 452 may not include the entirety of the speech from the length of the conference, but may only include individual words or groups of words as they are received within the audio stream(s). Similarly, the translation 456 may be output one or more words at a time. Further, as discussed above, if the translation process 416 updates a translation based on subsequently received words 452, it may output a translation 456 including a flag to indicate that the translation 456 updates previously output translated words. The translation 456 may also include additional information to specify which portion of the previously output translated words are to be replaced with the new translation 456.

Further, and in addition to translating audio streams, the virtual conference provider 410 may also translate chat messages sent using chat functionality within the software client. Since chat messages are already in a textual form, they may be provided directly to the appropriate translation process 416 and the translation 456 corresponding to the chat messages 460 may be generated and output to any requesting participants.

While the example shown in FIG. 4 illustrates only a single language identification process 418, a single transcription process 414, and a single translation process 416, any number of such processes 418, 414, 416 may operate simultaneously for a single virtual conference. Further the virtual conference provider 410 may host multiple concurrent virtual conferences, each of which may be allocated one or more language identification, transcription, and translation processes 418, 414, 416.

Figure 5A:
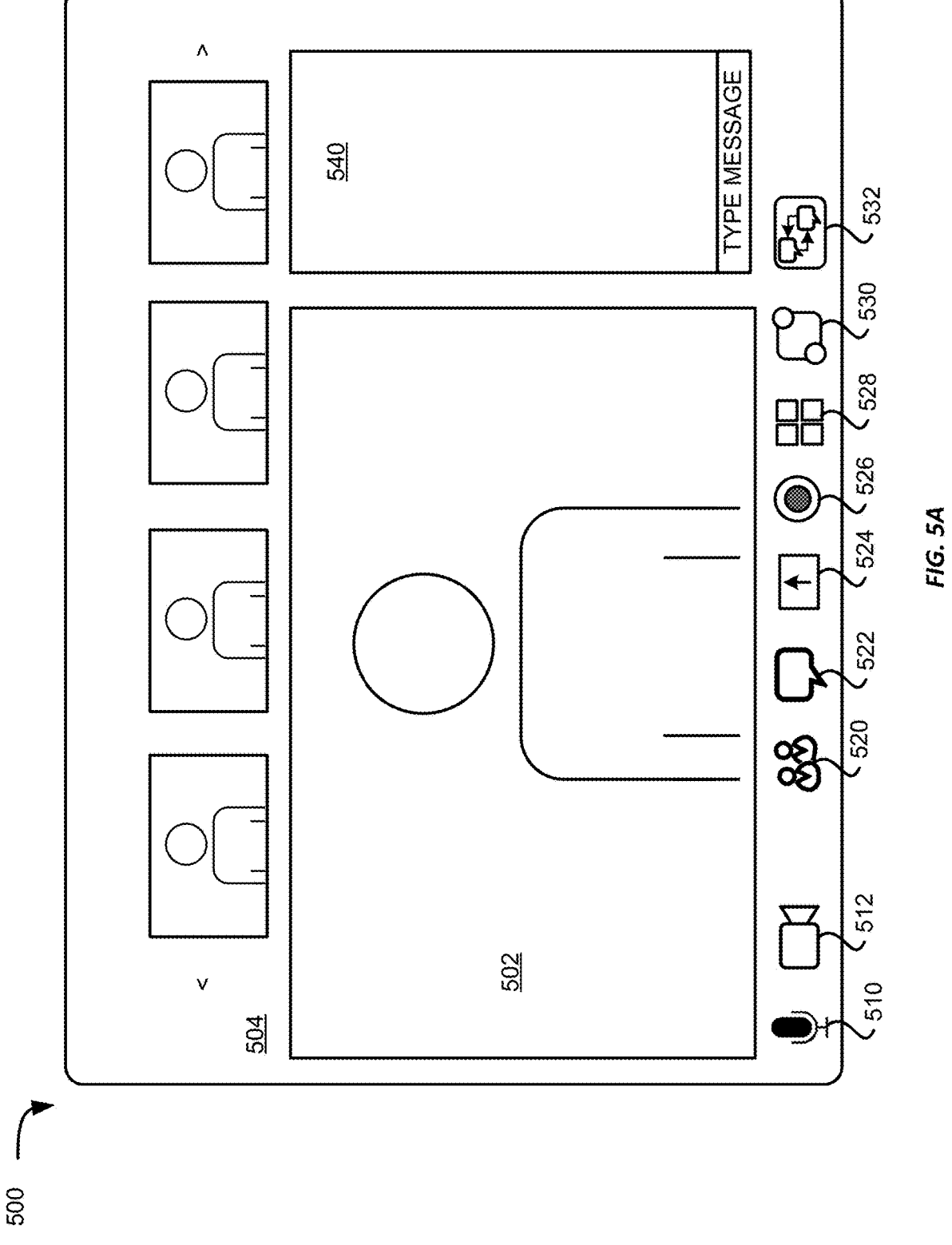
FIGS. 5a-b show example graphical user interfaces ("GUIs") for detecting languages during virtual conferences.
Figure 5B:
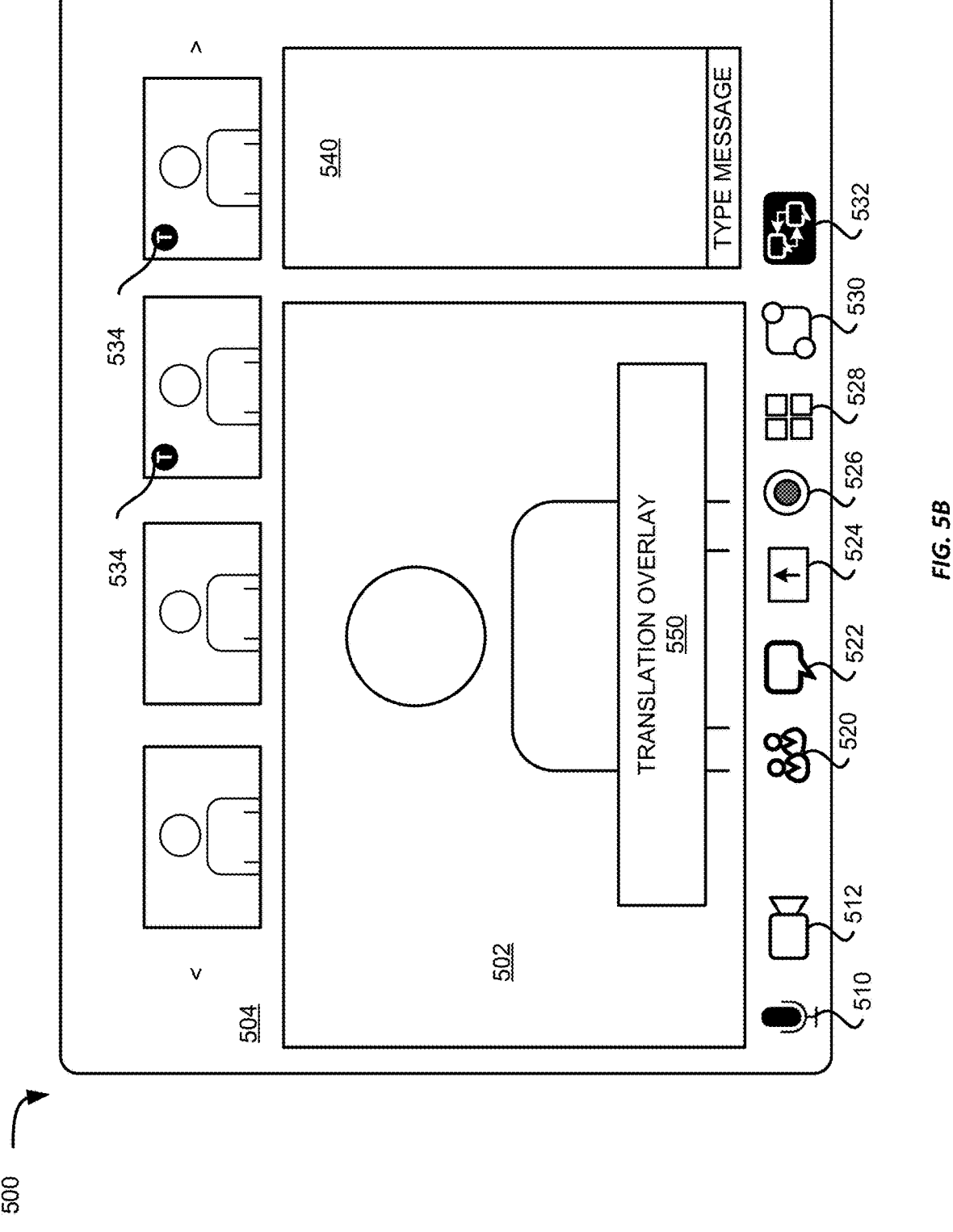

Referring now to FIGS. 5A-5B, FIG. 5A illustrates an example GUI 500 for a software client that can interact with a system for providing real-time translation during virtual conferences. A client device, e.g., client device 330 or client devices 340*a-n*, executes a software client as discussed above, which in turn displays the GUI 500 on the client device's display. In this example, the GUI 500 includes a speaker view window 502 that presents the current speaker in the video conference. Above the speaker view window 502 are smaller participant windows 504, which allow the participant to view some of the other participants in the video conference, as well as controls ("<" and ">") to let the host scroll to view other participants in the video conference. On the right side of the GUI 500 is a chat window 540 within which the participants may exchange chat messages.

Beneath the speaker view window 502 are a number of interactive elements 510-530 to allow the participant to interact with the video conference software. Controls 510-512 may allow the participant to toggle on or off audio or video streams captured by a microphone or camera connected to the client device. Control 520 allows the participant to view any other participants in the video conference with the participant, while control 522 allows the participant to send text messages to other participants, whether to specific participants or to the entire meeting. Control 524 allows the participant to share content from their client device. Control 526 allows the participant toggle recording of the meeting, and control 528 allows the user to select an option to join a breakout room. Control 530 allows a user to launch an app within the video conferencing software, such as to access content to share with other participants in the video conference.

In addition to controls 530, a translation button 532 is provided by the GUI 500 which allows the user to request translations of audio within a virtual conference. When the translation button 532 is selected, the user may be presented with the option to select a source or target language or one or more participants or the chat window 540 to translate. In some examples, the video conference provider may automatically detect languages, or participants may establish the language(s) they understand or speak within a user profile or when accessing the virtual conference. The languages can be detected by a language identification process 418 as described above. Thus, in some examples the user may not need to select a source or target language. For example, if each user's language is automatically detected or otherwise provided, such as by a user profile, the virtual conference provider may select the user's language as the target language and any participants who are either not speaking the user's language or do not have the user's language set in their user profile, the virtual conference provider may automatically select source and target languages for translation functionality.

During the normal course of a video conference, the user interacts with the video conferencing application and other participants via the GUI 500. And if translation functionality is desired, the user may select the translation button 532.

FIG. 5B illustrates the GUI 500 after the user has pressed the translation button 532, which has darkened to indicate the translation functionality is active. In addition, translation notifications 534 have been overlaid on participant windows within the conference whose audio or chat messages are being translated. In some examples, a user may interact with a translation notification 534 to determine a source language for the participant, such as in an example where the virtual conference provider is able automatically determine a source language for each speaker.

In addition to providing the translation notifications 534, the GUI 500 provides a translation overlay 550 on the speaker window 502, which provides the output from the translation process(es) that have been allocated to the virtual conference and that correspond to the translations requested by the user. The translation overlay 550 may provide scrolling text corresponding to the real-time translation of the audio streams and further may identify the speaker corresponding to each translated audio stream. Thus, the user may read along with the translation to understand what is being said. Similarly, if participants whose audio streams are being translated make use of the chat functionality, the chat window 540 may present the translated text corresponding to the original chat messages in the source language. Some examples may show both the untranslated and the translated chat messages for the user. Thus, by selecting the translate button, the user is able to quickly and easily enable translation functionality within a virtual conference and see the translations in real-time during the virtual conference.

To enable a more seamless translation experience in this example, the virtual conference provider auto-detects the language used by a speaking participant using a language identification process. A language identification process, such as language identification process 418, can be implemented using a machine learning model. The machine learning model can be a convolutional neural network that is trained on audio segments containing speech in various languages. The machine learning model can receive an input comprising an audio stream, or a segment of an audio stream, containing speech in a language. The model may output a probability, or confidence score, that the speech is in a particular language. If the machine learning model is trained to recognize more than one language, the output may be a n-length tuple where n is the number of languages that the model is trained to recognize. In some circumstances, n may be the number of languages plus an unknown language indicator if the model is trained to classify a language as an unknown language. The machine learning model may be more than one model if, for instance, a model is trained to recognize a single language or a subset of the languages recognized by the language identification process.

To train the machine learning model, audio segments from a known language (e.g., training data) can be provided as input to the machine learning model. The machine learning model can output a classification (e.g., confidence score) for the input audio segments, and, during training, the model parameters can be modified until the output classification for a the input audio segment matches the known language for that segment. For a neural network, the model parameters can be the total number of nodes, the number of nodes in a layer, the number of layers, and the weights for connections between nodes. Once the model properly classifies the training data, the model can be tested on verification data. The verification data can be audio segments, from a known language, that were not used earlier in the training process. If the machine learning model correctly classifies the verification data, the machine learning model can be a trained machine learning model.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 6:
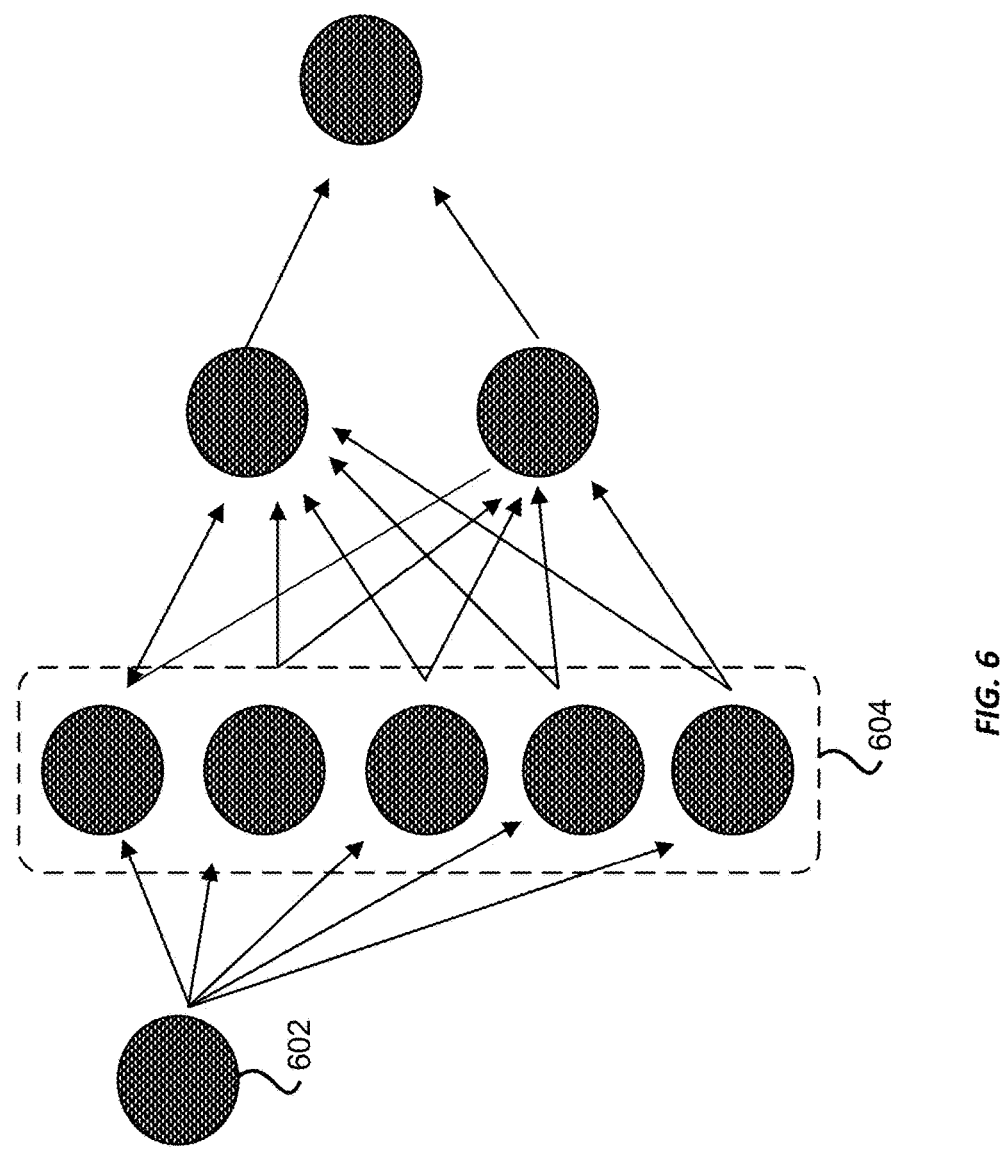
FIG. 6 shows an example machine learning model for detecting languages during virtual conferences.
Figure 6:

FIG. 6 shows an example machine learning model of a neural network. As an example, the language identification process can provide translation using a neural network that comprises a number of neurons (e.g., neuron 602; Adaptive basis functions) organized in layers (e.g., layer 604). The training of the neural network can iteratively search for the best configuration of the parameters of the neural network for feature recognition and classification performance. Various numbers of layers and nodes may be used. A person with skills in the art can easily recognize variations in a neural network design and design of other machine learning models.

Figure 7:
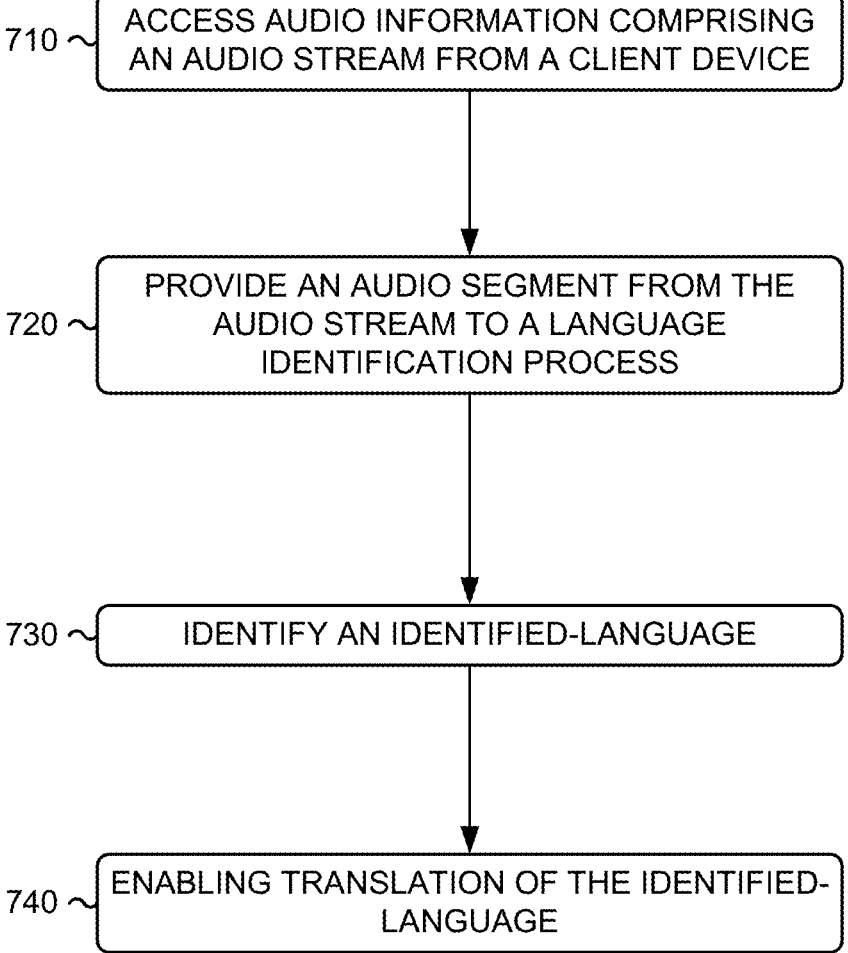
FIGS. 7-8 show example methods for providing detecting languages during virtual conferences.

Referring now to FIG. 7, FIG. 7 shows an example method 700 for detecting a language in an audio stream. This example method 700 will be described with respect to the systems 100-400 shown in FIGS. 1-4, the example GUIs 500 shown in FIGS. 5a-b, and the example machine learning model 600 shown in FIG. 6; however, any suitable systems or GUIs according to this disclosure may be employed.

At block 710, the video conference provider 410 accesses audio information comprising an audio stream 450. In some instances, the audio information can be words 452 or transcript 454. The audio stream 450 can be an audio stream from one or more client device 220-250. The audio stream 450 can be provided to the video conference provider 410 via a communications network 120-130.

At block 720, an audio segment from audio stream 450 can be provided to a language identification process 418. The audio segment can be a subsection, or clip, taken from audio stream 450. The subsection can be different lengths and for instance the audio segment can be 1 millisecond (ms), 0.5 seconds (s), 1 s, 2 s, 5 s, 10 s, 30 s, etc. The audio segment can be a number of words or characters taken from words 452 or transcript 454. For example, the audio segment can be a sentence, a fixed character limit, or a fixed number of words. A computing device of the virtual conference provider 410 or a client device 220-250 can generate an audio segment from the audio stream 450. The audio segment can be provided directly to the language identification process 418 or the audio segment can be provided to the language identification process 418 via transcription process 414. In some instances, the audio stream 450 can be provided to the language identification process 418 without segmentation, or the language identification process 418 can segment the audio stream 450 to produce an audio segment.

At block 730, an identified language 458a-b can be identified by the language identification process 418. The language identification process can identify the language using a machine learning model 600. The machine learning model 600 can be a convolutional neural network, and the machine learning model 600 can be trained to identify a plurality of languages. The audio segment from block 720 can be input into the machine learning model 600 and a classification, or identified-language 458a-b, for the audio segment can be output by the model. The identified-language 458a-b may indicate that speech in the audio segment is from one of the plurality of languages, or the speech is from an unidentified language. The output from the machine learning model 600 may be a confidence score, or probability, that the audio segment contains speech from one or more languages of the plurality of languages. The identified-language 458a-b can be updated to the language with the highest confidence score, or the identified-language 458a-b may be updated if a confidence score is above a threshold. If the confidence score is below a threshold the identified-language 458a-b may not be updated or the identified-language 458a-b may be updated to an unidentified language indicator.

At block 740, the identified-language 458a-b can be translated to the target language. The identified-language 458a-b can be translated by providing the identified-language to a translation process 416. The identified-language 458a-b can be directly provided to the translation process 416 from the language identification process 418, or the identified-language 458a-b can be provided to the translation process 416 via transcription process 414. The identified-language 458a-b can be provided to one or more client devices 220-250 via communication networks 120-130. A notification can be provided to the one or more client devices 220-250 via a graphical user interface 500.

The description of the example method 700 provides a particular ordering of functionality for purposes of illustration. However, it should be appreciated that virtual spaces are dynamic and operate asynchronously. Thus, as members interact with the virtual conference provider 210, 310 or 410 to request transcription services, translation services, or language identification, the state of the virtual conference provider changes based on those interactions. And since the interactions may be driven by user selections or occur in response to user inputs, they may occur in any suitable ordering or any number of times. Thus, the method 700 illustrates functionality available within the space according to one example sequence of interactions with the virtual conference provider 210, 310 or 410. In some examples, various steps may be performed in different orders or may be omitted.

Figure 8:
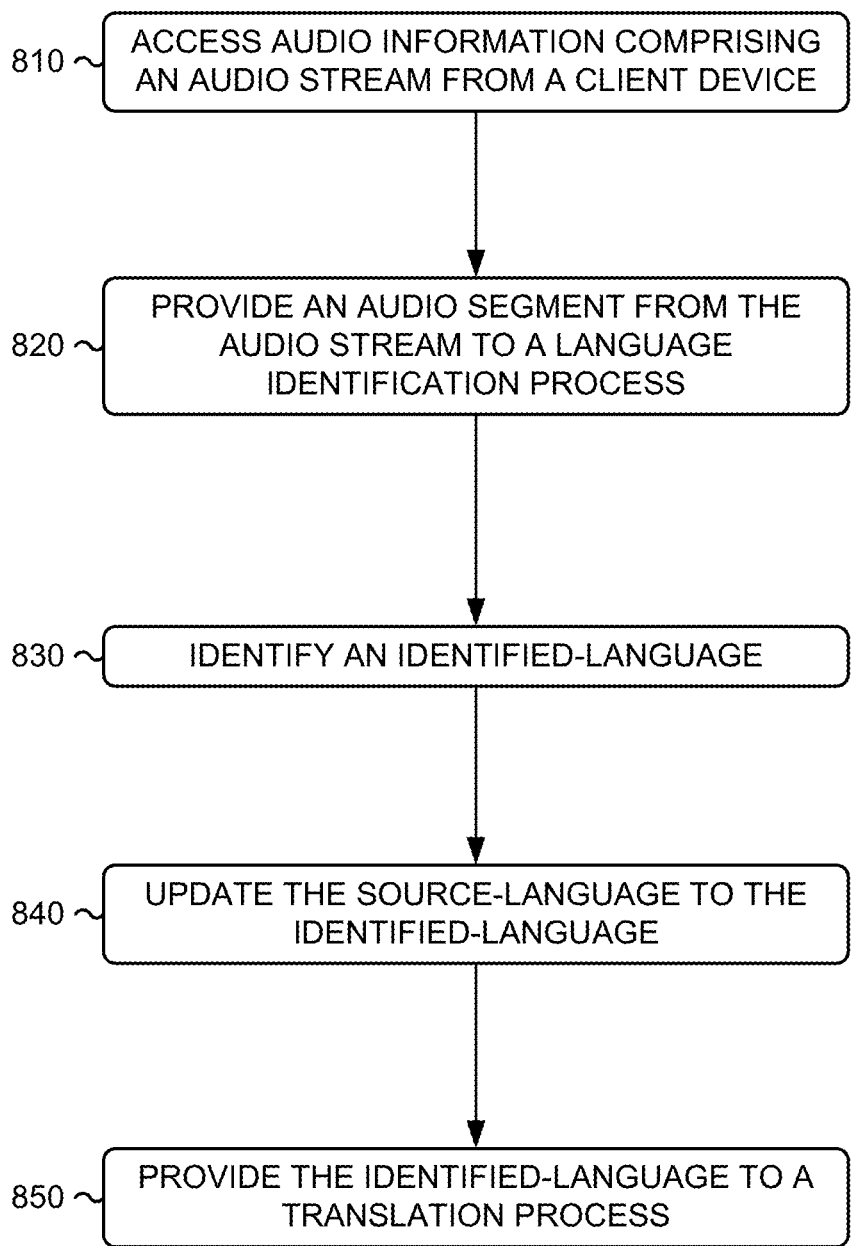

Referring now to FIG. 8, FIG. 8 shows an example method 800 for detecting a change of language in an audio stream. This example method 800 will be described with respect to the systems 100-400 shown in FIGS. 1-4, the example GUIs 500 shown in FIGS. 5a-b, and the example machine learning model 600 shown in FIG. 6; however, any suitable systems or GUIs according to this disclosure may be employed.

At block 810, the video conference provider 410 accesses audio information comprising an audio stream 450. In some instances, the audio information can be words 452 or transcript 454. The audio stream 450 can be an audio stream from one or more client device 220-250. The audio stream 450 can be provided to the video conference provider 410 via a communications network 120-130.

At block 820, an audio segment from audio stream 450 can be provided to a language identification process 418. The audio segment can be a subsection, or clip, taken from audio stream 450. The subsection can be different lengths and for instance the audio segment can be 1 millisecond (ms), 5 ms, 10 ms, 50 ms, 100 ms, 0.5 seconds (s), 1 s, 2 s, 5 s, 10 s, 30 s, etc. The audio segment can be a number of words or characters taken from words 452 or transcript 454. For example, the audio segment can be a sentence, a fixed character limit, or a fixed amount of words. A computing device of the virtual conference provider 410 or a client device 220-250 can generate an audio segment from the audio stream 450. The audio segment can be provided directly to the language identification process 418 or the audio segment can be provided to the language identification process 418 via transcription process 414. In some instances, the audio stream 450 can be provided to the language identification process 418 without segmentation, or the language identification process 418 can segment the audio stream 450 to produce an audio segment.

At block 830, an identified language 458a-b can be identified by the language identification process 418. The language identification process can identify the language using a machine learning model 600. The machine learning model 600 can be a convolutional neural network, and the machine learning model 600 can be trained to identify a plurality of languages. The audio segment from block 820 can be input into the machine learning model 600 and a classification, or identified-language 458a-b, for the audio segment can be output by the model. The identified-language 458a-b may indicate that speech in the audio segment is from one of the plurality of languages, or the speech is from an unidentified language. The output from the machine learning model 600 may be a confidence score, or probability, that the audio segment contains speech from one or more languages of the plurality of languages. The identified-language 458*a-b* can be updated to the language with the highest confidence score, or the identified-language 458*a-b* may be updated if a confidence score is above a threshold. If the confidence score is below a threshold the identified-language 458*a-b* may not be updated or the identified-language 458*a-b* may be updated to an unidentified language indicator.

The identified-language 458*a-b* can be identified when recognizing speech in successive audio segments (e.g., contiguous audio segments from the audio stream). Recognizing speech in a segment can be based on the speech recognized in the preceding segments. A source language, for example French, may be updated if an identified-language 458*a-b*, such as Spanish, is recognized in two or more successive audio segments. The identified-language 458*a-b* can be identified by recognizing speech within a sliding window (e.g., a trailing 10 second time period). A threshold number of audio segments in the window can be used to identify the identified-language 458*a-b*. For instance, a language can be updated if a number of audio segments containing speech from a new language, or a percentage of audio segments in the window containing speech in the new language, are above a threshold.

At block 840, the source-language can be updated to the identified-language 458*a-b*. The source-language can be updated by providing the identified-language 458*a-b* from the language identification process 418 to the transcription process 414, or the translation process 416. The transcription process 414 or translation process 416 can compare the source-language with the identified-language 458*a-b*, and, if the source-language and identified-language 458*a-b* differ, the transcription process 414 or translation process 416 can update the source-language. The source-language can be exchanged between the transcription process 415 and translation process 416. The language identification process 418 can compare the source-language and identified-language 458*a-b* and update the source-language if the source-language and identified-language 458*a-b* differ. The language identification process 418 can send an instruction, containing the updated source-language, to the transcription process 414 or translation process 416, or it can allocate a new transcription or translation process 414, 416 as needed. If the source-language is updated, previously translated, or transcribed, language can be translated, or transcribed in the updated-source language. For instance, audio segments for the last 10 seconds can be provided again to a transcription process or translation process. Audio segments for the last 0.1 seconds (s), 0.2 s, 0.5 s, 1 s, 2 s, 5 s, 10 s, 30 s, etc. can be provided to a transcription process or a translation process for the updated source-language. Updating the source language can include changing the current translation process or transcription process to a new translation process or a new transcription process. Updating the source-language can also include changing from a transcription process to a translation process or from a translation process to a transcription process.

The language identification process 418 can update a change-flag from a passive state to an active state if the source-language is updated. A change timer can be initiated by the language identification process in response to the source flag entering an active state. The language identification process 418 can switch the change-flag to a passive state when the change timer ends. The change timer can be 1 millisecond (ms), 5 ms, 10 ms, 50 ms, 100 ms, 0.5 seconds (s), 1 s, 2 s, 5 s, 10 s, 30 s, etc. While the change flag is in an active state, the language identification process 418, transcription process 414, or translation process 416 may not update the source-language. The length of an audio segment may change while the change-flag is in an active state, and an audio segment may be longer for the duration of the change timer. The threshold for the confidence score from step 830 may increase while the change-flat is in an active state.

The source-language may be provided to a client device 220-250 via a communications network 120-130. A notification indicating that the source-language has changed may be provided to the client via a graphical user interface 500. The client device 220-250 may store the updated source-language for use in future videoconferences. The source-language may be associated with a user profile and stored by video conference provider 210 or user identity provider 215.

The description of the example method 800 provides a particular ordering of functionality for purposes of illustration. However, it should be appreciated that virtual spaces are dynamic and operate asynchronously. Thus, as members interact with the virtual conference provider 210, 310 or 410 to request transcription services, translation services, or language identification, the state of the virtual conference provider changes based on those interactions. And since the interactions may be driven by user selections or occur in response to user inputs, they may occur in any suitable ordering or any number of times. Thus, the method 800 illustrates functionality available within the space according to one example sequence of interactions with the virtual conference provider 210, 310 or 410. In some examples, various steps may be performed in different orders or may be omitted.

Figure 9:
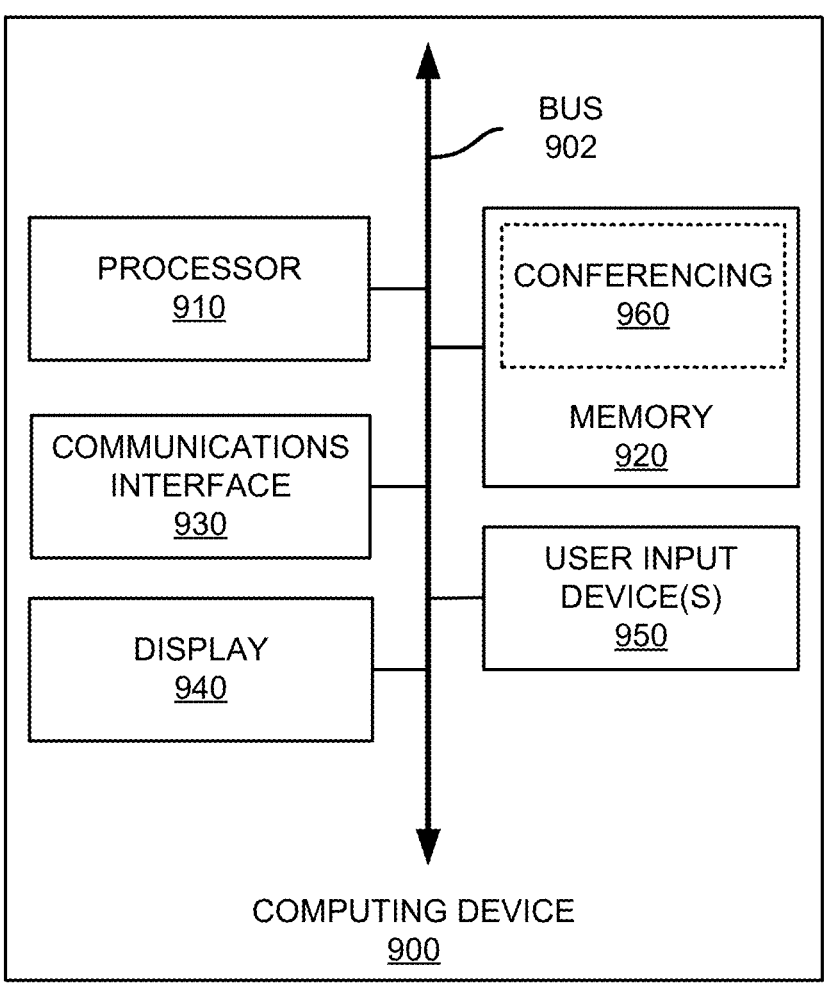
FIG. 9 shows an example computing device suitable for use with example systems and methods for providing real-time translation during virtual conferences.

Referring now to FIG. 9, FIG. 9 shows an example computing device 900 suitable for use in example systems or methods for automated language identification during virtual conferences according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for automated language identification during virtual conferences according to different examples, such as part or all of the example methods 700, 800 described above with respect to FIGS. 7 and 8. The computing device 900, in this example, also includes one or more user input devices 950, such as a keyboard, mouse, touchscreen, microphone, etc., to accept user input. The computing device 900 also includes a display 940 to provide visual output to a user.

In addition, the computing device 900 includes a video conferencing application 960 to enable a user to join and participate in one or more virtual spaces or in one or more conferences, such as a conventional conference or webinar, by receiving multimedia streams from a video conference provider, sending multimedia streams to the video conference provider, joining and leaving breakout rooms, creating video conference expos, etc., such as described throughout this disclosure, etc.

The computing device 900 also includes a communications interface 940. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A computer-implemented method, comprising:
accessing, by a computing device of a video conferencing provider system, audio information comprising an audio stream from a client device, and an indication of a source-language;
segmenting, by the computing device, the audio stream into a plurality of audio segments;
providing, by the computing device, the plurality of audio segments from the audio stream to a language identification process of the computing device comprising a plurality of machine learning models, each model of the plurality of machine learning models trained to recognize a respective language or subset of languages of a plurality of languages within recorded speech and output one or more confidence scores indicative of a likelihood that the recorded speech corresponds to a respective language of the plurality of languages, wherein:
the plurality of machine learning models comprise one or more convolutional neural networks trained on audio segments containing speech in one or more languages; and
the one or more confidence scores comprise a plurality of confidence scores corresponding to the plurality of languages and unidentified language;
identifying, by the language identification process of the computing device, an identified-language of the plurality of languages for the recorded speech based at least in part on detecting the identified-language in two or more successive audio segments of the plurality of audio segments; and
updating, by the computing device, the indication of the source-language to the identified-language.

2. The method of claim 1, wherein the indication of the source-language is updated if the indication of the source-language and identified-language differ.

3. The method of claim 1, wherein the updating further comprises: toggling, by the computing device, a change-flag from passive to active for a duration of a change-timer.

4. The method of claim 3, wherein the indication of the source-language is updated if the change-flag is set to passive.

5. The method of claim 3, wherein a machine learning model the plurality of machine learning models identifies a language, of the plurality of languages, if a confidence score of the one or more confidence scores for the language is above a first confidence threshold.

6. The method of claim 5, wherein the first confidence threshold is changed to a second confidence threshold while the change-flag is active.

7. The method of claim 1, wherein, the updating further comprises:
changing, by the computing device, a translation process or a transcription process based on the updated indication of the source-language.

8. The method of claim 1, wherein the plurality of confidence scores comprise an n-tuple of confidence scores, wherein n corresponds to the number of languages that the plurality of machine learning models are trained to recognize.

9. A non-transitory computer-readable medium storing a set of instructions, the set of instructions comprising:

one or more instructions that, when executed by one or more processors of a computing device, cause the computing device to:

access audio information comprising an audio stream from a client device, and an indication of a source-language;

segment the audio stream into a plurality of audio segments;

provide the plurality of audio segments from the audio stream to a language identification process of the computing device comprising a plurality of machine learning models, each model of the plurality of machine learning models trained to recognize a respective language or subset of languages of a plurality of languages within recorded speech and output one or more confidence scores indicative of a likelihood that the recorded speech corresponds to a respective language of the plurality of languages, wherein:

the plurality of machine learning models comprise one or more convolutional neural networks trained on audio segments containing speech in one or more languages; and the one or more confidence scores comprise a plurality of confidence scores corresponding to the plurality of languages and unidentified language;

identify an identified-language of the plurality of languages for the recorded speech based at least in part on detecting the identified-language in two or more successive audio segments of the plurality of audio segments; and update the indication of the source-language to the identified-language.

10. The non-transitory computer-readable medium of claim 9, wherein the indication of the source-language is updated if the indication of the source-language and identified-language differ.

11. The non-transitory computer-readable medium of claim 9, wherein the updating further comprises:

toggle a change-flag from passive to active for a duration of a change-timer.

12. The non-transitory computer-readable medium of claim 11, wherein the indication of the source-language is updated if the change-flag is set to passive.

13. The non-transitory computer-readable medium of claim 11, wherein a machine learning model the plurality of machine learning models identifies a language, of the plurality of languages, if a confidence score of the one or more confidence scores for the language is above a first confidence threshold.

14. The non-transitory computer-readable medium of claim 13, wherein the first confidence threshold is changed to a second confidence threshold while the change-flag is active.

15. The non-transitory computer-readable medium of claim 9, wherein, the updating further comprises: changing, by the computing device, a translation process or a transcription process based on the updated indication of the source-language.

16. A computing device, comprising:

one or more memories; and one or more processors, communicatively coupled to the one or more memories, configured to:

access audio information comprising an audio stream from a client device, and an indication of a source-language;

segment the audio stream into a plurality of audio segments;

provide the plurality of audio segments from the audio stream to a language identification process of the computing device comprising a plurality of machine learning models, each model of the plurality of machine learning models trained to recognize a respective language or subset of languages of a plurality of languages within recorded speech and output one or more confidence scores indicative of a likelihood that the recorded speech corresponds to a respective language of the plurality of languages, wherein:

the plurality of machine learning models comprise one or more convolutional neural networks trained on audio segments containing speech in one or more languages and the one or more confidence scores comprise a plurality of confidence scores corresponding to the plurality of languages and unidentified language;

identify an identified-language of the plurality of languages for the recorded speech based at least in part on detecting the identified-language in two or more successive audio segments of the plurality of audio segments; and update the indication of the source-language to the identified-language.

17. The computing device of claim 16, wherein the indication of the source-language is updated if the indication of the source-language and identified-language differ.

18. The computing device of claim 16, wherein the updating further comprises:

toggle a change-flag from passive to active for a duration of a change-timer.

19. The computing device of claim 18, wherein the indication of the source-language is updated if the change-flag is set to passive.

20. The computing device of claim 18, wherein a machine learning model the plurality of machine learning models identifies a language, of the plurality of languages, if a confidence score of the one or more confidence scores for the language is above a first confidence threshold.

* * * * *